July 13, 1965 R. SIMPSON 3,193,962
HERRING LEADER INSERTER
Filed Feb. 13, 1964

INVENTOR
Reginald Simpson

United States Patent Office 3,193,962
Patented July 13, 1965

3,193,962
HERRING LEADER INSERTER
Reginald Simpson, 136 W. 3rd Ave., North Vancouver,
British Columbia, Canada
Filed Feb. 13, 1964, Ser. No. 344,596
4 Claims. (Cl. 43—4)

This invention relates to fishing apparatus and more particularly to a device for attaching dead or live bait to a trolling line in such a way as to impart lifelike action to a dead minnow and to retain the bait in a very natural position to simulate the bait as it would normally appear while swimming.

Several devices of this type have been introduced to the market but all fail to retain a dead minnow in a lifelike position since they all pull from the back underside of the minnow they cause it to curl and spin when drawn in the water during trolling operation.

Broadly my invention comprises an awl or leader puller, a mouth piece which, when used in conjunction with a rubber band keeps the mouth closed to prevent water entering the mouth and splitting the stomach and a peg to cause the pull on the line to be in front of the head instead of in the rear to retain the minnow in a lifelike position and prevent curl and spin while trolling.

It is to overcome the above mentioned objections to present day devices that I have devised my invention.

The main object of the invention is therefore the provision of a device to thread a dead or live minnow on a leader provided with a set of treble hooks and secure it in such a manner as to prevent curling and spinning of the minnow when drawn in the water.

Another object is the provision of a device which enables a fisherman to use all sizes of minnow with equal facility.

Still another and very important object is the provision of a mouth piece which, when used in conjunction with a rubber band will keep the mouth of the minnow closed to prevent water entering through the mouth and splitting the stomach.

Still another object is to provide a device which will cause the pull to be at the front of the fish instead of at the rear so that the minnow will not curl and spin when drawn in the water. This object is achieved by the use of a peg binding the leader at the mouth piece.

With these and other objects that may appear as the description proceeds, the invention consists in the novel arrangement of cooperating elements as hereinafter more specifically set forth, claimed and shown in the accompanying drawing forming part of this application and in which:

Figure 5:
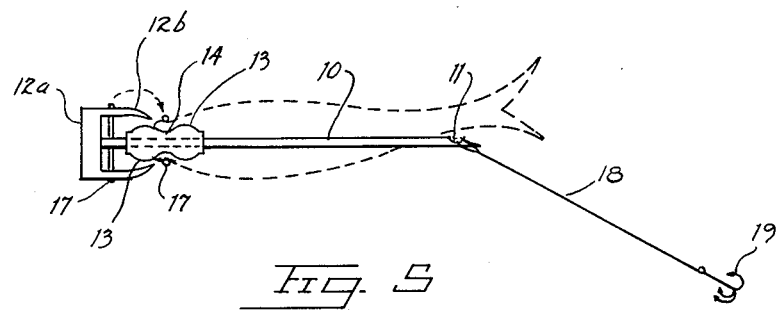
FIGURE 5 shows how a minnow is mounted on a leader with the present invention.

Referring more in detail to the drawing in which similar reference characters designate corresponding parts throughout the several views, it will be seen the invention consists of a minnow piercer and leader puller 10 formed with a hook 11 at one extremity and a handle 12 at the opposite extremity. In a modified version of the invention, I provide a handle 12a of a different construction, the purpose of which will hereinafter be more specifically set forth. The invention also provides a mouth piece which comprises a tubular member formed of a pair of spheres separated by a depressed area 14. The said mouth piece is adapted to slide over the piercer before the said piercer is engaged into a minnow, and pushed directly against the handle 12 or 12a as shown in FIGURE 5 of the accompanying drawing.

A peg comprising an elongated pointed body 15 and a head 16 also forms part of the invention and is used with the mouth piece to secure a leader as hereinafter more specifically set forth.

To bait a dead or live minnow, the invention is used in the following manner.

The mouth piece is placed on the minnow piercer and pushed against the handle 12. The piercer is then pushed into the mouth of the minnow through the body and out in the vicinity of the vent as shown in FIGURE 5 of the drawing. The mouth piece is then pushed into the mouth of the minnow until one of the spheres 13 is well into the mouth and an elastic band 17 is slipped over the snout of the fish to seal said snout in the depressed area 14 between the spheres 13. The elastic band completely seals the mouth opening so that water cannot enter when the minnow is pulled in the water to split open the stomach of the minnow.

Figure 6:
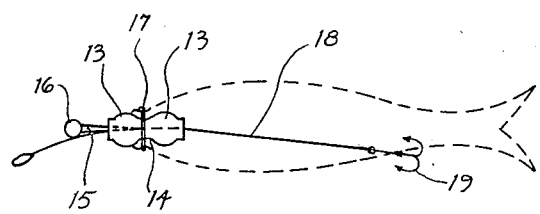
FIGURE 6 shows a minnow in position for trolling with the leader puller removed from the minnow.

A leader 18 provided with a set of treble hook 19 is secured to the hook 11 formed at one of the extremities of the piercer. The piercer, by means of a handle or finger grip 12 is then pulled back pulling with itself the leader through the body of the minnow and out through the mouth piece. One of the hooks is set into the minnow as shown in FIGURE 6 and a peg forced into the mouth piece to bind the leader against the mouth piece thus assuring that the pull is at the front of the minnow and not from the hook as is the base with most of present day trolling devices. When the pull is against the hook, this causes the minnow to curl and twist when drawn in the water and such action of the minnow being entirely different from that of a live or wounded minnow considerably reduces the chances of a fisherman landing a fish.

Figure 1:
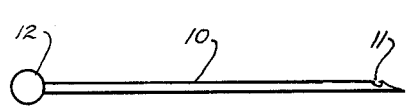
FIGURE 1 is a side elevation view of a minnow piercer and leader puller.
Figure 2:
FIGURE 2 is a view of the mouth piece.
Figure 3:
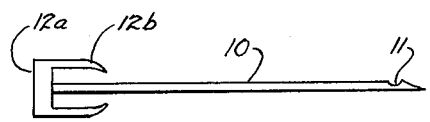
FIGURE 3 is another form of a minnow piercer and leader as shown in FIGURE 1.
Figure 4:
FIGURE 4 is a detail of the peg used in conjunction with the mouth piece to cause the pull to be in front of the minnow.

The invention also provides an alternative type of minnow piercer which facilitates the placement of the elastic band around the snout of the minnow. This device is illustrated in FIGURE 3 of the accompanying drawing. It is similar in construction to the minnow piercer illustrated in FIGURE 1 with the exception of the finger grip 12a which consists of a disc 12a provided with a plurality of fingers 12b having their free extremity slightly bent in to rest directly against the snout of a minnow when in use. As illustrated in FIGURE 5, the elastic band is placed over the fingers 12b and after the mouth piece has been inserted into the mouth of the minnow, and with the free sphere placed inside the fingers, the elastic band is pushed forward over the snout of the minnow.

It is believed that the construction and advantages of the invention have been fully set forth and that further detailed description is not required.

While the preferred embodiment of the invention has been disclosed, it is to be understood that minor modifications may be resorted to without departing from the spirit of the invention and the scope of the claims.

The embodiments of the invention in which an exclusive property or privilege is claimed are defined as follows:

I claim:

1. A device for inserting the leader of a fish hook through the body of a minnow comprising a piercer adapted to be inserted through the mouth of the minnow and out through the body, a tubular member slidably mounted on said piercer for insertion in the mouth of the minnow, means for clamping the mouth of the minnow and tubular member together, a hook at one end of said piercer for engaging the leader of the fish hook, a finger grip at the opposite end of said piercer for inserting and withdrawing said piercer and means for securing the leader in fixed engagement with said tubular member after the leader is drawn through said tubular member upon withdrawal of said piercer.

2. A device as described in claim 1 wherein said tubular member has a depressed portion intermediate its ends to effect a seal with the mouth of the minnow when in clamped position.

3. A device as described in claim 1 wherein said means for clamping the mouth of the minnow is an elastic band fitted over the mouth and said tubular member has a depressed area intermediate its ends to receive said elastic band.

4. A device for inserting the leader of a fish hook through the body of a minnow comprising a piercer adapted to be inserted through the mouth of the minnow and out through the body, a tubular member slidably mounted on said piercer for insertion in the mouth of the minnow, said tubular member having an annular depressed area intermediate its ends, an elastic band adapted to be fitted over the mouth of the minnow to compress the mouth into sealing engagement with the depressed area of said tubular member, a hook at one end of said piercer for engaging the leader of the fish hook, and a handle extending transversely of the opposite end of said piercer having opposed fingers parallel to said piercer for supporting said elastic band while inserting said piercer into the mouth of the minnow.

References Cited by the Examiner
UNITED STATES PATENTS

| | | | |
|---|---|---|---|
| 1,902,217 | 3/33 | Catarau | 43—44.2 |
| 2,161,274 | 6/39 | Behrend | 46—90 |
| 2,500,078 | 3/50 | Ingram | 43—44.91 |
| 2,584,231 | 2/52 | Schmidt | 43—4 |
| 2,605,578 | 8/52 | Waterton | 43—44.2 X |
| 2,764,160 | 9/56 | Alexander et al. | |
| 2,886,932 | 5/59 | Davis. | |

ABRAHAM G. STONE, *Primary Examiner*.